Figure 1:
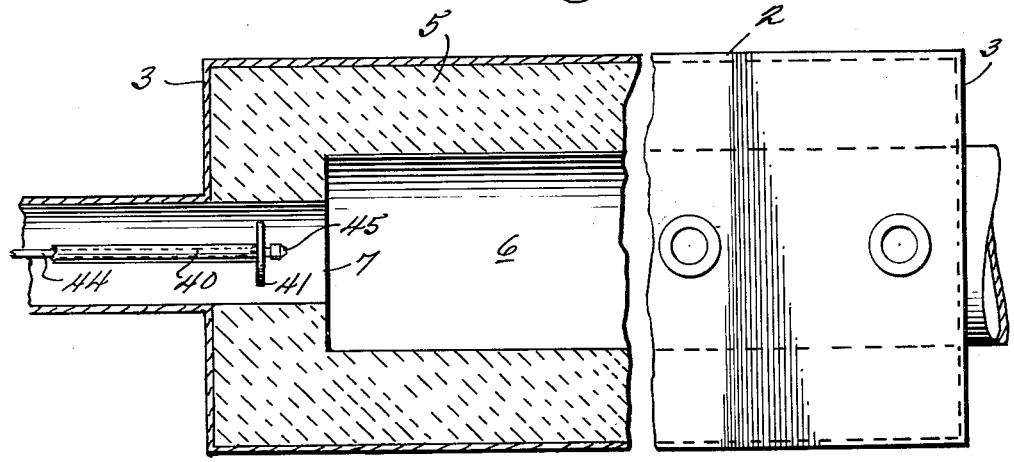

INVENTOR
THEODORE A. RUBLE
BY HENRY H. HUTH
ATTORNEY

United States Patent Office 3,009,787
Patented Nov. 21, 1961

3,009,787
APPARATUS FOR MAKING CARBON BLACK
Theodore A. Ruble, Amarillo, Tex., assignor to Continental Carbon Company, Amarillo, Tex., a corporation of Delaware
Original application Dec. 1, 1958, Ser. No. 777,390. Divided and this application Aug. 27, 1959, Ser. No. 836,433
2 Claims. (Cl. 23—259.5)

The present invention relates to the manufacture of carbon black from any type of hydrocarbons, including petroleum oils.

It is generally known in the art that the superior grades of carbon blacks characterized by smaller particle size are obtained by high temperature cracking reaction which proceeds to its conclusion in the shortest possible time; and that the high temperature is attained by complete combustion of a fuel gas and the injection of hydrocarbon mist or vapor directly into the hot products of combustion. Usually, excess air is admitted into the combustion process in order to obtain additional heat from the partial combustion of the oil. It is also well known in the art that rapid mixing of the hydrocarbon mist or vapor with the hot products of combustion is essential for carbon black possessing the desired particles of small size.

I am aware of numerous patents which disclose the obtaining of oil mists or vapors either by heat vaporization or mechanical spray nozzles, as well as other patents which disclose refractory lined furnaces which are so constructed and arranged as to obtain turbulent flow and thorough mixing of the hydrocarbon mist or vapors with the hot products of combustion of either fuel gas or oil. Also the patent, and other, literature contains disclosures of a combination of mist injection and refractory lined furnaces for producing carbon black that depend upon rotational flow or refractory obstructions or similar devices to obtain turbulence and mixing of the hot products of combustion and the carbon containing feedstock.

It is among the objects of the present invention to provide an improved apparatus for making carbon black from hydrocarbon, such as petroleum oils, and particularly one wherein the combustion air and fuel gas are mixed by a high degree of turbulence, the air-gas mixture ignited, and the hydrocarbon (in mist or vapor form) introduced into the flame base at the point where combustion starts; and does not depend on prior complete combustion of gaseous fuel. Extreme turbulence is obtained by passing a mixture of gas and air at high velocity through a metallic orifice or restriction, and the further expansion of the gas by rapid combustion. By injecting the oil mist or vapor directly into this extremely turbulent and burning zone prior to complete combustion, the cracking reaction obtains its heat instantaneously as the heat is released from the combustion. The extreme turbulence, heat, and mixing is almost entirely obtained by the arrangement of the injection device and is not dependent upon a refractory furnace lining of intricate design. In this connection, excellent results have been obtained by using a simple refractory tube which is cylindrical in shape and which contains no obstructions, refractory orifices, or other devices calculated to promote turbulence.

According to the apparatus of the present invention, it is not necessary to protect the refractory walls of the furnace from carbon deposits by utilizing an envelope of combustion gases which surround the injected oil mist or vapor, since the reaction is virtually complete before the hydrocarbon mist or vapor can reach the refractory walls.

Another object is the provision of a novel apparatus wherein the quality of the end product may be varied over a rather wide range by regulating the velocity of the hydrocarbon through the injector, recognizing that the higher the velocity, the greater the turbulence which results in carbon black of smaller particle size.

Still another object is to provide an apparatus capable of obtaining the foregoing objectives which is comparatively simple and inexpensive to manufacture, install and maintain.

Generally stated, the apparatus of the present invention is constructed and arranged to effect
(1) Co-mingling of the fuel gas and air in the inlet port (or ports) of a combustion chamber.
(2) Thorough mixing of the fuel gas and air by passing the mixture through an orifice or restriction at high velocity.
(3) Passage of the mixture of fuel gas and air immediately into a combustion chamber wherein the gas burns in a turbulent flame at a high temperature.
(4) Introduction of the oil (hydrocarbon) in an atomized or vaporized state into the turbulent flame base where the combustion starts, whereby the finely subdivided hydrocarbon comes in violent contact with the turbulent hot gases, resulting in a rapid rate of heat transfer to the hydrocarbon and rapid cracking to carbon black.
(5) Cooling of the hot gases and suspended carbon black by means of quench sprays or heat exchanges, or both, to a point where the reaction stops and the gas is cool enough to handle in a carbon black collecting device.

The invention, then, comprises the features hereinafter fully described and as particularly pointed out in the claims, the following description and the annexed drawings setting forth in detail certain illustrative embodiments of the invention, these being indicative of some of several ways in which the principles of the invention may be employed.

Figure 2:
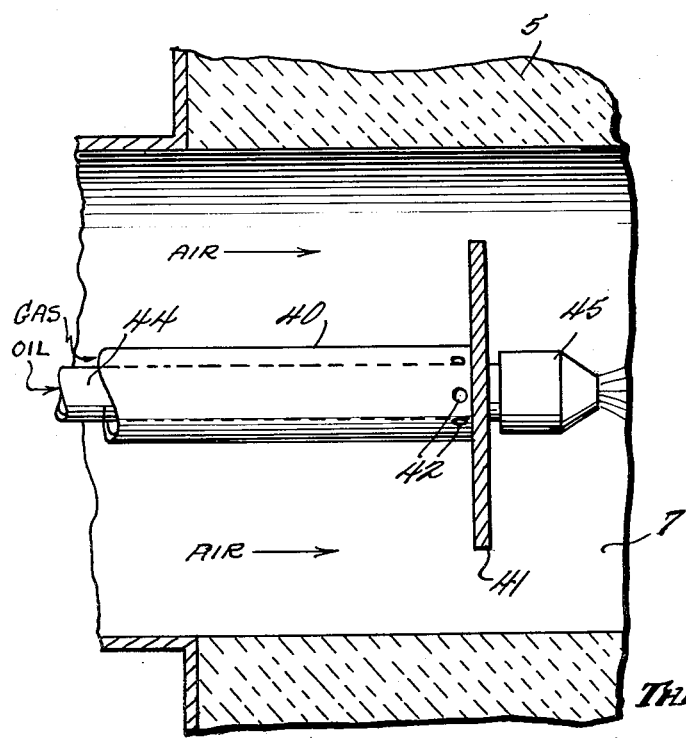

In said drawings:
FIGURE 1 is a longitudinal elevation, partly in section, of a form of apparatus which embodies the teachings of the present invention; and
FIGURE 2 is an enlarged longitudinal view, partly in section, which illustrates in detail the orifice type burner of the apparatus.

Referring more particularly to the drawings, the numeral 2 designates an elongate metallic housing or shell which is provided at each end with an inwardly directed annular flange 3.

Disposed within the metallic housing or shell 2 and its annular end flanges 3 is a refractory furnace lining 5 which defines a cylindrical chamber 6 within which the combustion and cracking operation take place.

That portion of the refractory lining which defines the inlet end of the furnace or reactor is shaped to provide an axially aligned and communicating cylindrical inlet port 7 of substantially reduced diameter.

Disposed to extend partially into the cylindrical inlet port 7, and in axial alignment therewith, is a metallic pipe 40. That is, the metallic pipe 40 terminates short of the inner end of the cylindrical inlet port 7. To the inner end of the metallic pipe 40 there is secured a metallic circular plate or disk 41 which constitutes the flame holder of the burner apparatus of the present invention. The diameter of the metallic circular plate or disk 41 is much greater than the diameter of the fuel gas supply pipe 40, being shown in FIGURE 2 as approximately three times the size. On the other hand, the diameter of the metallic circular plate or disk 41 is much less than the diameter of the cylindrical port 7.

The oil supply pipe of the apparatus, which is indicated at 44 is disposed axially within the fuel gas supply pipe 40 and extends through the center of the flame holder disk 41, terminating in a spray nozzle 45.

According to the foregoing construction and arrangement of parts, air enters through the inlet port and mixes with the fuel gas which is supplied by the fuel gas pipe 40 and discharged therefrom through the peripheral discharge apertures 42 which are located immediately behind the flame holder disk 41. The gas passes around the flame holder disk along with the air; and a uniform mixture is obtained by means of the turbulent flow. The spray nozzle 45 which is disposed on the inner end of the oil pipe 44 and immediately in front of the flame holder disk 41 atomizes the liquid hydrocarbon and introduces the fine droplets into the base of the flame at the point where the combustion starts.

If a vaporized hydrocarbon is used, the spray nozzle 45 may be removed and an open-end pipe substituted therefor.

From the foregoing, it will be seen that the flame holder disk 41 and associated elements will produce a uniform mixture of fuel gas and air by passing the mixture of fuel gas, air and hydrocarbon oil through a restriction which, in turn, produces a high degree of turbulence and also results in a higher turbulent flame upon ignition. The hydrocarbon is introduced into the turbulent flame at a point where combustion starts; and the fuel gas, air, and hydrocarbon are all introduced perpendicularly to the inlet wall of the furnace so that no rotative motion of the main mass of burning gas results. The mixing fuel gas, air, and hydrocarbon may, of course, be introduced into the combustion chamber through one or more inlet ports 7 containing flame holders, etc., as previously described.

The products consisting of gases and suspended carbon black are cooled by means of the aforementioned quench sprays and/or a heat exchange (following the combustion zone) to a temperature low enough to handle in one of the standard collecting devices common to the carbon black industry. Most of the suspended carbon black is removed in the carbon black collector; and the effluent gases are discharged to the atmosphere.

The present application is a division of my patent application Serial No. 777,390, filed December 1, 1958.

While I have shown and described certain specific embodiments of the present invention, it will be readily understood that I do not wish to be limited exactly thereto, since various modifications may be made without departing from the scope of the invention as defined in the appended claims.

I claim:

1. In an apparatus for making carbon black, a cylindrical combustion chamber having an axially disposed directly communicating cylindrical inlet port of substantially reduced diameter; a fuel gas supply pipe disposed concentrically in said cylindrical inlet port and terminating short of the inner end of the latter; a circular plate secured to the inner end of said fuel gas supply pipe and in axial alignment therewith; the diameter of said circular plate being substantially greater than that of said fuel gas supply pipe but substantially less than the diameter of said cylindrical inlet port; the wall of said fuel gas supply pipe having a series of radial apertures disposed adjacent the rearward face of said circular plate; an oil supply pipe disposed concentrically of said fuel gas supply pipe; the inner end of said oil supply pipe extending through and projecting slightly from said circular plate; said plate being otherwise imperforate; and means for supplying combustion air to said cylindrical inlet port.

2. In an apparatus for making carbon black, a cylindrical combustion chamber having an axially disposed directly communicating cylindrical inlet port of substantially reduced diameter; a fuel gas supply pipe disposed concentrically in said cylindrical inlet port and terminating short of the inner end of the latter; a circular plate secured to the inner end of said fuel gas supply pipe and in axial alignment therewith; the diameter of said circular plate being substantially greater than that of said fuel gas supply pipe but substantially less than the diameter of said cylindrical inlet port; the wall of said fuel gas supply pipe having a series of radial apertures disposed adjacent the rearward face of said circular plate; an oil supply pipe disposed concentrically of said fuel gas supply pipe; the inner end of said oil supply pipe extending through and projecting slightly from said circular plate; said plate being otherwise imperforate; a spray nozzle on the projecting end of said oil supply pipe; and means for supplying combustion air to said cylindrical inlet port.

References Cited in the file of this patent

UNITED STATES PATENTS

| | | |
|---|---|---|
| 2,682,450 | Sweigart et al. | June 29, 1954 |
| 2,686,560 | Sweigart | Aug. 17, 1954 |
| 2,825,633 | Steele | Mar. 4, 1958 |
| 2,917,370 | Edminster et al. | Dec. 15, 1959 |